N. W. ROBINSON.
Hold-Back Hook.
No. 74,143.
Patented Feb. 4, 1868.
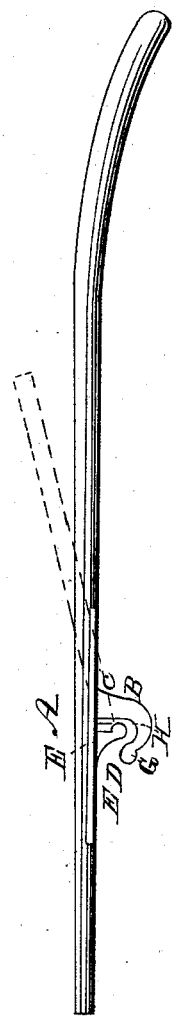

United States Patent Office.

N. W. ROBINSON, OF MORIAH, NEW YORK

Letters Patent No. 74,143, dated February 4, 1868.

IMPROVEMENT IN HOLD-BACK HOOK.

*The Schedule referred to in these Letters Patent and making part of the same.*

TO ALL WHOM IT MAY CONCERN:

Be it known that I, N. W. ROBINSON, of Moriah, in the county of Essex, and State of New York, have invented a new and useful Improvement in Hooks for Hold-Back Straps; and I do hereby declare that the following is a full, clear, and exact description thereof, which will enable those skilled in the art to make and use the same, reference being had to the accompanying drawings, forming part of this specification.

The present invention relates to an improvement in hooks for hold-back straps of harnesses, which improvement consists in a novel combination of a post with the hook, whereby the unfastening or detachment of the strap therefrom, by accident or otherwise, except so desired, is rendered impossible, while at the same time the unhitching of the strap, if desired, can be accomplished with the utmost ease and dispatch.

In the accompanying plate of drawings my improved hook is illustrated, the figure being a side view of the same in connection with the shaft to a wagon or other vehicle.

Similar letters of reference indicate corresponding parts.

A, in the drawings, represents my improved hook for hold-back straps of harnesses. B, the main portion to the hook, which by one end, C, is fastened to the carriage-shaft, leaving an opening, D, between the outer end E and the surface of the shaft. F, a post, fixed in the shaft, across the opening D to the hook, but in such a manner and of such a length as to leave a communicating passage or opening, G, between its outer end H and the inside face to the hook B, through which to pass the hold-back strap, that when in the hook is prevented from becoming detached by the post, as is obvious without any further explanation; the post offering no obstruction to the removal of the hold-back strap, if so desired.

Claim.

I claim as new, and desire to secure by Letters Patent—

The post F, in combination with the hook B, substantially as and for the purpose described.

N. W. ROBINSON.

Witnesses:
　ERASTUS POTTER,
　H. B. WILLARD.